United States Patent [19]
Rinne

[11] Patent Number: 5,386,769
[45] Date of Patent: Feb. 7, 1995

[54] ADJUSTABLE PRESS ROLLER USING SILICONE ELASTOMER AS PRESSURE MEDIUM

[76] Inventor: Erkki Rinne, Kylatie 9A1, SF-00320 Helsinki, Finland

[21] Appl. No.: 983,394

[22] Filed: Nov. 30, 1992

Related U.S. Application Data

[63] Continuation-in-part of Ser. No. 592,270, Oct. 3, 1990, Pat. No. 5,174,585.

[30] Foreign Application Priority Data

Oct. 3, 1989 [FI] Finland .................. 894671

[51] Int. Cl.⁶ .................. B30B 15/34; B30B 3/04
[52] U.S. Cl. .................. 100/93 ORP; 100/162 B; 100/169; 100/917; 492/7; 492/8; 492/20
[58] Field of Search .................. 100/93 RP, 162 B, 170, 100/917, 169; 492/2, 3, 7, 8, 20, 46

[56] References Cited

U.S. PATENT DOCUMENTS

| | | |
|---|---|---|
| 2,652,749 | 9/1953 | Hagmeister . |
| 3,497,226 | 2/1970 | Hohwart et al. . |
| 3,885,283 | 5/1975 | Biondetti . |
| 4,007,522 | 2/1977 | Hold et al. ............ 492/7 |
| 4,501,482 | 2/1985 | Stryjewski ............ 492/56 X |
| 4,711,168 | 12/1987 | Held . |
| 4,756,065 | 7/1988 | Carlson ............ 492/56 |

FOREIGN PATENT DOCUMENTS

| | | |
|---|---|---|
| 712794 | 7/1965 | Canada ............ 100/162 B |
| 824726 | 12/1951 | Germany . |
| 2254392 | 5/1974 | Germany . |
| 3207921 | 11/1992 | Germany . |
| 641466 | 8/1950 | United Kingdom . |
| 90/10796 | 9/1990 | WIPO . |
| 90/10809 | 9/1990 | WIPO . |
| 91/04814 | 4/1991 | WIPO . |

Primary Examiner—Stephen F. Gerrity
Attorney, Agent, or Firm—Christie, Parker & Hale

[57] ABSTRACT

A mechanism for regulating the external surface of an elastically deformable metal shell includes a temperature control for controlling roll sections and thus pressure controlling for controlling bending of a roller. The assembly provides a press roller with one or more pressing members for regulating nip pressure of a press roller against a counter roller. The assembly also provides a suction box with a mechanism for pressing it against a counter roller and a mechanism for pressing the counter roller against the box. The pressing mechanism are pressurized by use of a silicone elastomer compound which is in turn preferably pressurized by heating.

12 Claims, 4 Drawing Sheets

ADJUSTABLE PRESS ROLLER USING SILICONE ELASTOMER AS PRESSURE MEDIUM

CROSS-REFERENCE

This invention is a continuation-in-part application to U.S. application Ser. No. 07/592,270, filed Oct. 3, 1990, now U.S. Pat. No. 5,174,585 (incorporated by reference herein) in which priority under Finnish application No. 894671, filed Oct. 3, 1989 is claimed.

BACKGROUND OF THE INVENTION

1. Field of the Invention

This invention relates to an adjustable press roller for adjusting and controlling the nip deflection between the roller and a counter roller, the roller having a hollow cylindrical shell which is arranged rotatably around a stationary yoke or support being provided with pressing means for regulating the nip pressure between the press roller and its counter roller. The pressing means are arranged for pressing against an inner wall of the shell, the pressing member and the inner wall of the shell having a sliding engagement therebetween. The pressing means are arranged in one or more rows in the longitudinal direction of the yoke or support.

The invention relates also to an arrangement for adjusting and controlling the nip deflection between a suction box and a counter roller. The invention provides a closed pressurization system which uses, in combination, a hydro-elastic pressure medium and piston arrangements for pressurizing the pressing means. The pressure medium preferably is a room temperature vulcanizing silicone elastomer compound which is cast in situ in a pressure medium space. The piston means are used for pressurizing the pressure medium which, in turn, pressurizes the pressing means for pressing the hollow cylinder toward the counter roller. The pressure medium can be pressurized preferably by means of thermal expansion, which is controlled, for example, by electrical heating means. Preferably, the pressure medium is pressurized by the combination of piston means and electrical heating means, wherein the piston means are used for initial pressurizing of the pressure medium and heating means are used for fine adjustment of the nip pressure. The piston means can be used by means of any mechanical or electrical known apparatus.

2. Prior Art

It is commonly known in the art that there are many hydraulically functioning pressure rollers, as the number of the prior art publications show. The use of prior art solutions, which employ hydrostatic support elements, is known from U.S. Pat. No. 4,328,744, British Pat. No. 641,466, German Pat No. 22 54 392 and U.S. Pat. Nos. 3,885,283, 4,520,723, 4,440,077, and 3,703,862. The prior art systems employ hydraulic support elements having a battery of cylinders and pistons to receive pressurized fluid to ensure accurate adjustment of pressure to the different kind of shoes pressurizing the roller sleeve. None of these prior art publications show any solutions wherein the thermal expansion of an elastomer is used as a pressurizing medium in a closed system for the pressing element.

SUMMARY OF THE INVENTION

The present invention relates to improvements of calendar rolls, wherein a hollow cylindrical shell is arranged rotatably around a stationary carrier yoke. The solution of the present invention replaces normally used hydraulic elements. All of above prior art solutions are such that they require very high continuous power consumption and are very complicated and expensive constructions as a whole.

The invention provides new and improved means for regulating the external surface of an elastically deformable metal shell, wherein the system includes temperature control of the roll sections and thus also pressure control for controlling roller bending. The invention also provides a press roller, wherein several pressing means for regulating the nip pressure of adjacent rollers are arranged linearly in succession in a support yoke to form a section compensated roller wherein, in each section, the pressing means are pressurized by means of silicone elastomer compound which is pressurized by heating means. The heating means could be arranged inside or outside of a pressure medium space formed within the support yoke. The heating means could include, for example, an induction heater or thermal oil which are commonly known.

The invention further provides a calendar roller system, wherein the pressure medium volume change is influenced by means of temperature control of the pressure medium, preferably elastomer gel or rubber, which is pressurized by means of a mechanical piston element and expansion of the elastomer, wherein automatic pressure control is electrically guided to regulate the temperature of the elastomer and the temperature of the roller.

In addition, the invention provides a roller assembly, wherein an outer surface of the roller is bent and regulated by means of elements using thermal expansion of silicone rubber the thermal energy of which is controlled electrically.

Still further, the invention provides a roller assembly, wherein pressing means are actuated by silicone elastomer which is pressurized by piston means actuated by any known driving means, e.g., by a step motor or by a rotatable eccentric. In this solution, no heating means are required, although it is preferable to combine this solution with heating means.

Moreover, the present invention provides a stationary yoke or a long adjusting element to set and adjust deflections of rollers and their counterparts in paper machinery, wherein nip pressure of long rollers must be controlled accurately and automatically without complicated hydraulic systems.

Briefly stated, the invention relates to a new nip pressure controlled roller which is pressurized by means of room temperature vulcanizing (RTV) silicone elastomer, which silicone is cast in situ, into a pressure medium space in a support yoke or, alternatively, silicone elastomer is initially cured and the cured soft silicone elastomer is then pressed through a closable small hole into the pressure medium space, the hole being dimensioned in such a way that the pressing through the hole causes pulverizing of the elastomer facilitating its movement within the space. If the silicone is cast in situ into the pressure medium space, the walls of the space are previously treated with a release agent for preventing the silicone from sticking to the walls and for allowing displacement of silicone in the space.

In view of the operation, the whole former fluid space of old hydraulic roller is filled with soft RTV-silicone compound arrangement and its heating elements in order to replace hydraulic machinery used for the similar hydraulically operating calendar roller.

It is essential that the elastomer does not adhere to the wall surfaces, thus allowing the transmittance of pressure in small channels and pressure chambers. The behavior of RTV-silicone elastomer resembles that of fluid in the sense that it is incompressible to the same extent as the mineral oil. Preliminary tests have indicated that at a pressure of over 200 bars, e.g., in a passage having a diameter of 5 mm and a length of 500 mm, there occurs a nearly complete pressure equalization through the entire passage. The non-adherence of the elastomer to the walls can be improved by the application of the lubricants, which are compatible with silicone elastomer. A relatively freely moving silicone mass is also achieved when cured soft silicone is pressed through a small hole into the pressure space.

The above-mentioned and other objects and advantages of this invention will be more completely disclosed and described in the following specification, the accompanying drawings and the appended claims.

DETAILED DESCRIPTION OF THE PREFERRED EMBODIMENT

Figure 1:
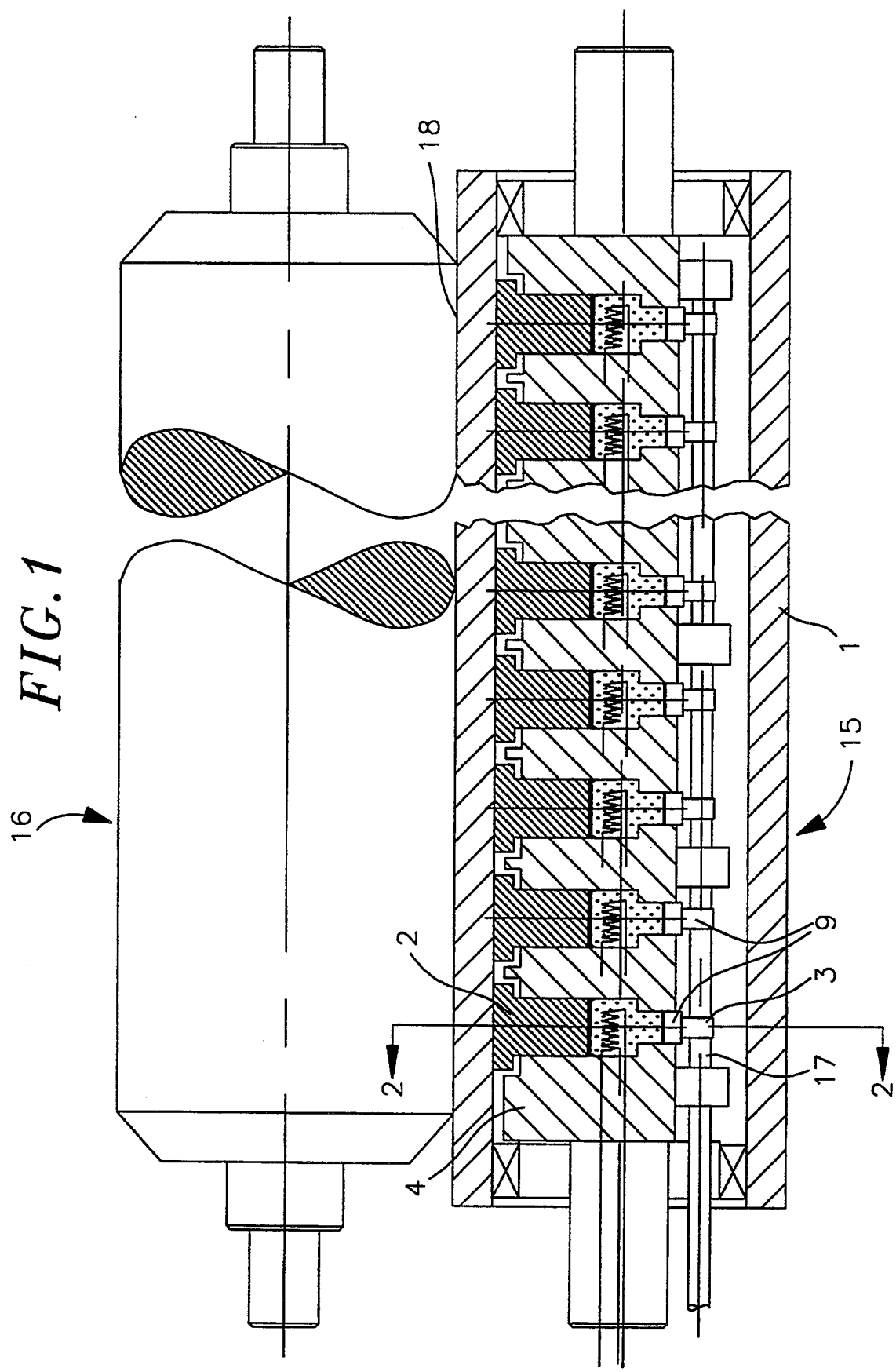
FIG. 1 is a schematic view in side elevation and partially in section of a press roller of the present invention.

According to the first aspect of the present invention, there is provided an adjustable press roller for adjusting the roller deflection and nip pressure between the roller and a counter surface, the roller including:
   a stationary yoke defining at least one opening surrounded by side walls and a bottom wall;
   a hollow cylinder shell made of steel arranged rotatably around the stationary yoke, and being adapted for pressing the nip,
   a pressing member mounted in the at least one opening of the yoke in slidable engagement with the side walls and for pressing against the inner wall of the shell, the pressing member and the inner wall of the shell having a sliding engagement therebetween, the pressing member and the opening defining a space;
   a pressure medium in the space for transmitting a force to the pressing member, wherein the pressure medium is a room temperature vulcanizing silicone elastomer compound, the silicone serving as a hydraulic fluid replacing pressure medium, whereby, upon application of pressure on the silicone by means of a pressure creating member, the silicone, by way of its expansion and deformation, transmits pressure to the pressing member which, in turn, presses against the inner wall of the shell. The shell thus deflects radially pressing the nip, and upon releasing the pressure, the silicone resumes its initial state, assisted by the tension of the expanded shell.

According to a second aspect of the present invention, there is provided an arrangement for adjusting and controlling the nip pressure between a suction box of a paper-making machine and a counter roller, the suction box having a bottom wall, side walls and a perforated top wall, the walls defining a suction chamber, wherein an endless wire is passing over the top wall, a nip being formed between the wire and counter roller placed opposite to the top wall of the suction box, the arrangement including:
   a stationary yoke placed on the exterior bottom side of the suction box, the yoke defining at least one opening surrounded by side walls and a bottom wall;
   a pressing member mounted in the at least one opening of the yoke in slidable engagement with the side walls for pressing against an exterior bottom wall of the suction box, the pressing member and the opening defining a space;
   a pressure medium in the space for transmitting a force to the pressing member, wherein the pressure medium includes a room temperature vulcanizing silicone elastomer compound, the silicone serving as a hydraulic fluid replacing pressure medium, whereby, upon application of pressure on silicone by means of a pressure creating member, the silicone, by way of its expansion and deformation, transmits pressure to the pressing member which, in turn, presses against the exterior bottom wall of the suction box. The box thus moves toward the counter roller pressing the nip, and upon releasing the pressure, the silicone resumes its initial state.

According to a third aspect of the present invention, there is provided an arrangement for adjusting and controlling the nip pressure between the roller and a suction box of a paper-making machine, wherein the roller includes:
   a stationary yoke defining at least one opening surrounded by side walls and a bottom wall;
   a hollow cylinder shell made of steel arranged rotatably around the stationary yoke, and being adapted for pressing the nip;
   a pressing member mounted in the at least one opening of the yoke in slidable engagement with the side walls and for pressing against inner wall of the shell, the pressing member and the inner wall of the shell having a sliding engagement therebetween, the pressing member and opening defining a space;
   a pressure medium in the space for transmitting a force to the pressing member, wherein the pressure medium is a room temperature vulcanizing silicone elastomer compound, the silicone serving as a hydraulic fluid replacing pressure medium, whereby, upon application of pressure on silicone by means of a pressure creating member, the silicone, by way of its expansion and deformation, transmits pressure to the pressing member which, in turn, presses against the inner wall of the shell, which shell thus expands radially pressing the nip. Upon releasing the pressure, the silicone resumes its initial state, assisted by the tension of the expanded shell.

Figure 2:
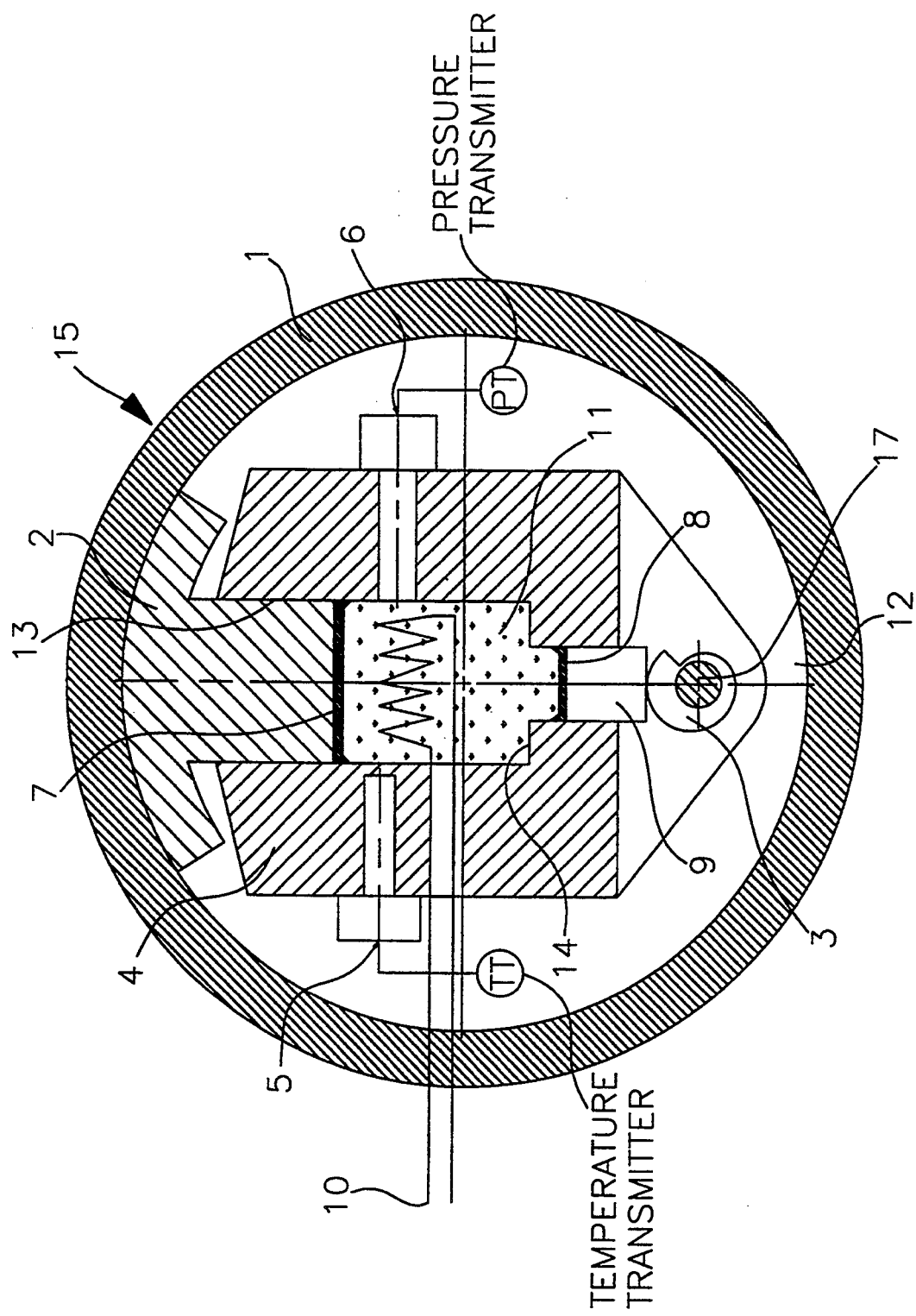
FIG. 2 is a sectional view taken along line 2—2 of FIG. 1.

According to FIGS. 1 and 2, a press roller 15 of the present invention includes a stationary support shaft or yoke 4 and a rotatable cylindrical shell 1 made of steel and spaced apart radially from the yoke. The yoke defines a plurality of openings 13, each of which is surrounded by side walls and a bottom wall 14.

In each opening 13, there is arranged a pressing member 2 in sliding engagement with the side walls of the opening. The pressing member 2 is arranged to extend outwardly from the yoke and to be moved against the inner wall of the shell for sliding engagement therewith and for pressing the shell 1 radially against a counter roller 16 for regulating the pressure in the nip 18 between the rollers. The end of the pressing member 2 facing toward the bottom wall 14 of the opening 13 and the bottom wall define a space therebetween. The space is filled with a silicone pressure medium 11 which is cast in situ.

In the illustrated embodiment, the space is initially fitted with an electric heating means 10, and the silicone elastomer is cast in situ thereafter, whereby the heating means is embedded therein. The pressure medium space is further provided with a pressure transmitter 6 and temperature transmitter 5 connected to an appropriate controlling unit for controlling the pressure and temperature of silicone elastomer 11. In the bottom wall of the opening, there is provided a further opening for a piston 9. The piston is provided with a seal layer 8 at an end facing the silicone elastomer layer. Similarly, the pressing member 2 is provided with a seal layer 7. The seal layers 7, 8 are preferably of plastic material harder than the silicone elastomer. In the illustrated embodiment, pistons 9 are actuated mechanically for quickly loading and releasing the roller pressure by means of a rotatable shaft 17 having eccentric cams 3.

The pistons 9 are preferably used for initial pressurizing of the silicone elastomer, and the heating means are used for fine adjustment of the silicone pressure and thus pressing force of the pressing members 2. The pistons 9 and their drive means 17, 3 are preferably provided with quick-release mechanisms in such a way that it is possible to release the pressure within the pressure medium space quickly, e.g., in the case of a web breaking.

The pressure creating piston 9 also could be actuated, for example, with magnetic power elements, such as electrical means for automatic control of force in each element. In this way, the number of mechanical parts are minimized.

In the illustrated embodiment (FIGS. 1 and 2) it is impossible to divide the rotatable shell into sections having different nip pressures by individual adjustment of each pressing member.

Figure 3:
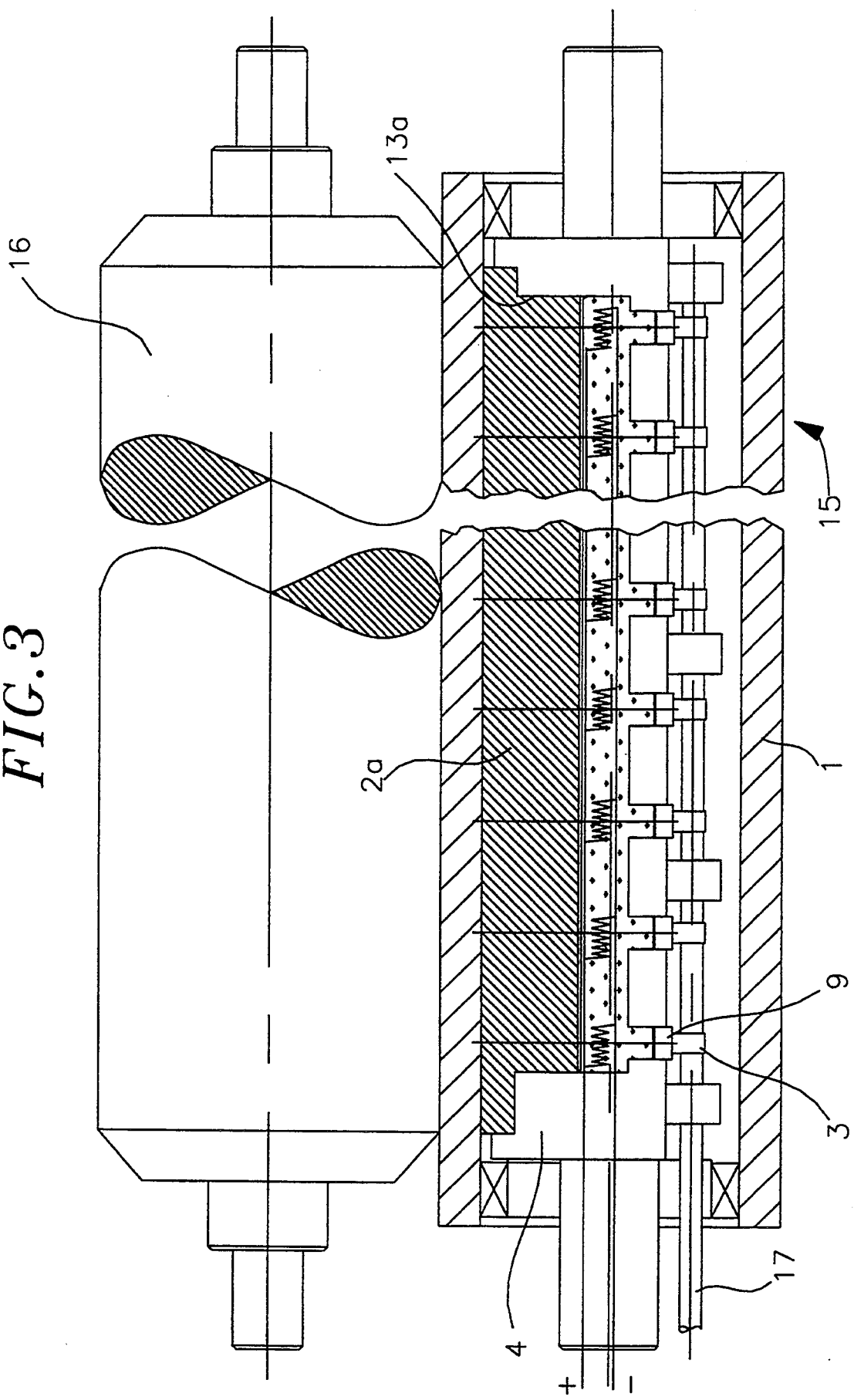
FIG. 3 is a similar view as that of FIG. 1, but is of a second embodiment of a press roller of the present invention.

The embodiment of FIG. 3 differs from the embodiment of FIGS. 1 and 2 in that the yoke 4 defines only one opening 13a which extends longitudinally over the main portion of the yoke, the bottom wall of the opening being provided with several further openings for piston means 9. The opening 13 is provided with a single pressing member 2a which extends longitudinally over the nip 18 between rollers 15 and 16. Other members are similar as in the previous embodiment, and, therefore, they need not be described again.

The pressing member 2 could be, for example, a magnetic bearing or fluid film bearing shoe. A magnetic bearing is a non-contact, non-lubricated electrical system that keeps rotating surfaces apart with magnetic force and where clearances, axial and linear, must be controlled with electrical means. Stationary components within a roller design are not expected to wear since there is no bearing friction. Parasitic bearing losses are avoided when the bearing is not a flooded design. The rotor position and clearances are continuously controlled with sensors and adjusting elements in order to keep rotating roller deflections in control as the element distances vary along the stationary yoke body section due to deflections of a yoke body section under pressure. A fluid film bearing shoe is a shoe wherein a fluid film is arranged between the shoe and counter surface.

In use, the silicone elastomer is heated by means of electrical heating means 10, whereby the thermal expansion of the silicone elastomer causes volume increase of about 8% per 100° C. and thus about 1000 bar pressure, provided that the space is totally rigid. As the pressure moves the pressing member 2 outwardly and expands the outer shell surface, the volume of the silicone increase and the probable pressure is respectively smaller. The pressure can be set at a desired level with a spring-loaded compensating piston and adjusting screw (not shown).

Figure 4:
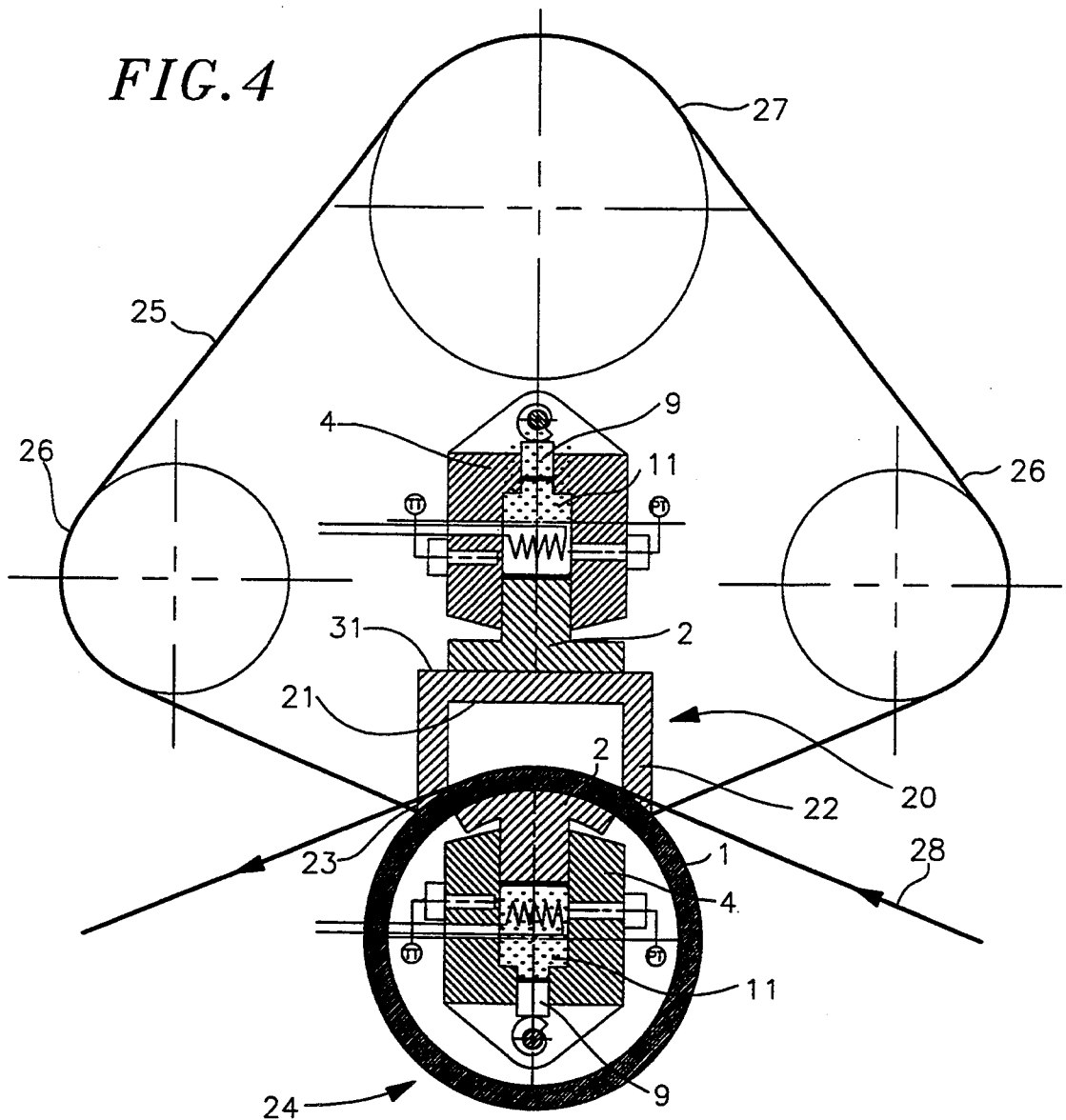
FIG. 4 is a schematic view of an arrangement of the present invention for adjusting and controlling the nip deflection between a suction box of a paper-making machine and a counter roller.

In FIG. 4 there is shown an embodiment according to a further aspect of the present invention, wherein a suction box 20, having a bottom wall 21, side walls 22, and a perforated top wall 23 is used in a paper-making machine instead of a nip roller. The suction box 20 is arranged to be moved toward a counter roller 24. An endless wire 25 is arranged to pass between suction box 20 and counter roller 24 over top wall 23 of the box. Rollers 26, 27 are arranged for rotating and supporting the wire 25. Between the wire 25 and counter roller 24 there is a nip through which a web 28 passes.

On the exterior bottom side of the box 20, there is a means for regulating nip deflection. This means is a stationary yoke 4 defining at least one opening surrounded by side walls and a bottom wall, a pressing member 2 mounted in the at least one opening of the yoke 4 in slidable engagement with the side walls for pressing against exterior bottom wall 30 of the suction box 20. The pressing member 2 and the opening define a space. Pressure medium 11 is disposed in the space for transmitting a force to the pressing member 2.

The pressure medium is a room temperature vulcanizing silicone elastomer compound. The silicone serves as a hydraulic fluid replacing pressure medium, whereby, upon application of pressure on the silicone by means of pressure creating members 9, 10, the silicone, by way of its expansion and deformation, transmits pressure to the pressing member 2 which, is in turn, pressing against the exterior bottom wall 30 of the suction box 20. The box thus moves toward counter roller 24 deflecting the nip, and upon releasing the pressure, the silicone resumes its initial state. The yoke 4, pressing means 2 and other elements are identical with those shown in FIGS. 1 and 2, and, therefore, they have not been described further. In FIG. 4, the same reference numerals are used for the identical elements shown in FIGS. 1 and 2.

The counter roller 24 structure and box pressing structure are otherwise the same as that of FIGS. 1 and 2 or 3. Thus, the arrangement for adjusting and controlling the nip pressure between a suction box of a paper-making machine and a counter roller could be carried out also by providing the counter roller 23 with similar elements as the press roller 15 of FIGS. 1 and 2 or FIG. 3. It is also possible to use a combination of a press roller of the present invention and an arrangement for moving the suction box. Such combination has been shown in FIG. 4.

It will be appreciated that the invention is susceptible to modifications and changes without departing from the scope of the appended claims.

What is claimed is:

1. An adjustable press roller for adjusting and controlling roller deflection and nip pressure between the press roller and a counter surface, said press roller comprising:

a stationary yoke defining at least one opening surrounded by side walls and a bottom wall;

a hollow cylindrical shell arranged rotatably around the stationary yoke, and being disposed for pressing the nip of the rollers, a pressing member mounted in the at least one opening of the yoke in slidable engagement with the side walls and for pressing against an inner wall of said shell to deflect the shell such that it radially presses on the nip and under tension, said pressing member and said inner wall of said shell having a sliding engagement therebetween, said pressing member and said opening defining a space;

a pressure medium disposed in the space for expanding and deforming to transmit a force to the pressing member and for returning to its initial state upon release of pressure thereon, wherein the pressure medium comprises a room temperature vulcanizing silicone elastomer compound, the silicone serving as a hydraulic fluid replacing pressure medium; and a pressure creating member for applying pressure on the silicone such that the silicone, by way of its expansion and deformation in response thereto, transmits pressure to the pressing member which is, in turn, pressing against the inner wall of said shell, which shell thus deflects radially pressing said nip, and upon releasing said pressure, the silicone resumes its initial state, assisted by the tension of the deflected shell.

2. The press roller of claim 1, wherein the room temperature vulcanizing silicone elastomer compound is cast in situ in the pressure medium space, and the walls defining the space having a release agent thereon for preventing the silicone from sticking to the walls and for allowing displacement of silicone in said space.

3. The press roller of claim 1, wherein the room temperature vulcanizing silicone elastomer compound is in a pulverized state, said pulverized state being formed by initially curing said room temperature vulcanizing silicone elastomer compound to form cured soft silicone elastomer which is then pressed through means defining a closable small hole and into said pressure medium space, said means defining said closable small hole being dimensioned in such a way that said pressing through said hole causes pulverizing of said elastomer facilitating its movement within said space.

4. The press roller of claim 1, wherein in said opening there is provided a piston member actuated by a drive means for setting the initial pressure of the pressure medium at a desired level.

5. The press roller of claim 1, wherein in said opening there is provided a spring loaded piston member for compensating and setting the pressure at a desired level, said piston member having an end disposed facing the silicone elastomer, said end being provided with a seal layer of harder plastic material than said elastomer.

6. The press roller of claim 1, wherein the body section includes a plurality of said openings disposed axially in succession, each opening being provided with said pressing means.

7. The press roller of claim 1, wherein the pressure creating member comprises a temperature controlled heating means for adjusting the volume of elastomer within said space and thereby adjusting its pressure.

8. The press roller of claim 1, wherein the pressing member comprises a magnetic bearing shoe.

9. The press roller of claim 1, wherein the sliding engagement between the pressing member and inner wall of the shell is assisted by a fluid film disposed therebetween.

10. The press roller of claim 1, wherein the pressure creating means comprises a temperature controlled heating element and piston element, and wherein said pressure creating means are provided with means for releasing created pressure quickly from the pressure medium space and thereby releasing pressure from the nip.

11. The press roller of claim 1, wherein the silicone elastomer compound is in a pulverized state.

12. The press roller of claim 1 wherein said shell comprises steel.

* * * * *